United States Patent [19]

Desgouilles

[11] 4,282,127

[45] Aug. 4, 1981

[54] POLYMER-CONTAINING BITUMINOUS COMPOSITION AND COMPOSITE SEALING SHEET INCLUDING THE SAME

[76] Inventor: Henri F. M. Desgouilles, Résidence La Closeraie, 4 Rue des Fontaines, 60500 Chantilly, France

[21] Appl. No.: 74,332

[22] Filed: Sep. 11, 1979

[30] Foreign Application Priority Data

Sep. 13, 1978 [FR] France .............................. 78 26336

[51] Int. Cl.$^3$ .............................................. C08L 91/00
[52] U.S. Cl. .......................... 260/28.5 AS; 427/389.8; 427/391; 427/434.2; 427/442; 427/443; 428/441; 428/491; 428/511
[58] Field of Search ............. 260/28.5 AS; 427/389.8, 427/391, 434.2, 442, 443; 428/441, 491, 511

[56] References Cited

U.S. PATENT DOCUMENTS

| 3,459,695 | 8/1960 | Hedge et al. ......................... 260/28.5 |
| 3,790,519 | 2/1974 | Wahlborg ...................... 260/28.5 AS |
| 4,081,502 | 3/1978 | Blümel et al. ................ 260/28.5 AS |
| 4,091,134 | 5/1978 | Uemura et al. ............... 260/28.5 AS |

FOREIGN PATENT DOCUMENTS

| 51-8331 | 1/1976 | Japan ................................ 260/28.5 AS |
| 51-8332 | 1/1976 | Japan ................................ 260/28.5 AS |

*Primary Examiner*—Melvyn I. Marquis
*Attorney, Agent, or Firm*—Young & Thompson

[57] ABSTRACT

This invention relates to a bitumen-based composition comprising a ternary mixture of (a) 52–78 wt % bitumen, (b) 20–40 wt % polyolefin and (c) 2–8 wt % of a butadiene-styrene copolymer.

Said composition is useful alone for sealing purposes as a melt or a solution, and is also useful for the production of composite sealing sheets.

14 Claims, No Drawings

POLYMER-CONTAINING BITUMINOUS COMPOSITION AND COMPOSITE SEALING SHEET INCLUDING THE SAME

This invention relates to a polymer-containing bituminous composition and to its applications, particularly for sealing purposes.

Among the raw materials potentially useful for sealing purposes, bitumen has been known and used since early antiquity.

The physical state of bitumen varies with its use.

Bitumen is in the molten state when used as a coating to be applied with heating. It is also in the molten state when combined by coating with reinforcing supports, such as felt board, glass fibres, synthetic fibres and like reinforcing supports. It may also be in the form of a solution or of an emulsion.

There is already known a family of sealants provided in the form of manufactured sheets of varying thicknesses, generally available as rolls in which the bitumen is combined with the aforementioned supports.

Such sheets should possess sealing characteristics and should be capable of withstanding the stresses imposed by their environment, particularly: the mechanical stresses due to the motions of the work on which they are applied; natural atmospheric stresses (due to temperature, sun, and the like) and artificial stresses (such as chemical and physical attacks).

The different families of bitumen-based sealants use three major types of this raw-material:

(1) straight-run bitumens, which comprise the residual portion remaining after vacuum distillation of petroleum. The chief varieties are, for example, bitumens 40/50, 80/100 and 180/200 (the two figures mentioned refer to the needle penetration values determined at 25° C. according to NFT 66 004). Their softening point (about 40°–50° C.) named TBA (see NFT 66 008) is relatively low. They are highly susceptible to temperature and may not be used alone in the solid state on substantial slopes: they exhibit excessive flow properties on roofs at temperatures up to 70°–90° C.

(2) oxidized bitumens obtained by blowing air at elevated temperatures in certain straight-run petroleum and/or bitumen cuts. This treatment increases the softening point and decreases the penetration: for example 100/40 (the first figure refers to the value of the softening point TBA and the second figure refers to the penetration value at 25° C.).

While such bitumens have a satisfactory flow resistance, in contrast, they have poor flexural properties in the cold and, on the other hand, particularly in the cold, they exhibit low ultimate tensile elongation values.

(3) thermoplastic bitumens-polymers, among which may be mentioned the following combinations which have noteworthy industrial applications:

Bitumen-poly(ethylene-vinyl acetate), so-called Bitumen EVA

Bitumen-poly(styrene-butadiene-styrene), so-called Bitumen SBS, and

Bitumen-poly(atactic propylene), so-called Bitumen PPA.

Although they are more susceptible to temperature than the oxidized bitumens, they have a high softening point ($\leq 100°$ C.) and they have satisfactory flow behavior.

The properties that are markedly changed, with respect to oxidized bitumens, concern:

flexibility in the cold, which is outstanding, particularly in the case of bitumen SBS;

ultimate tensile elongation (according to NFG 07 001) which is very high (about 2000%) in the case of bitumen SBS.

In contrast, as compared with an oxidized bitumen, bitumen SBS cannot withstand undeteriorated a temperature of 250° C.: thermal degradation in the presence of oxygen is excessively rapid. The resistance to the flame of a blow-torch may also provide some limitations concerning the use of such a welding method in the case of SBS bitumens.

For their part, PPA bitumens have predominant viscous character properties. Their elastic behavior is highly limited as compared to a SBS bitumen; elongation at break varies between 100% and 300%. On the other hand, in the cold, their properties generally do not reach those of SBS bitumens.

In contrast, PPA bitumens withstand most satisfactorily high thermal stresses, for example: up to 250° C. in the molten state.

It is apparent from the above that, for practical applications, the bituminous compositions should exhibit a very good flexibility in the cold, a high resistance to thermal stresses and good ageing properties. Such a combination of characteristiics is not attained with any prior art bituminous composition.

U.S. Pat. No. 4,000,140 describes a sealing sheet comprising a bitumen- and synthetic polymers-based composition, particularly a polyolefin and an elastomer. But since this sealing sheet does not include any supporting material and uses a low-bitumen composition (5–30% bitumen content) it is unsatisfactory for the applications contemplated here.

Therefore, this invention has for its object to provide a bitumen-based composition having the above-mentioned characteristics free from the drawbacks of the prior art compositions.

The bitumen-based composition of this invention comprises a ternary mixture of (a) 52–78wt% bitumen; (b) 20–40wt% polyolefin and (c) 2–8wt% of a butadiene-styrene elastomer.

The composition of this invention exhibits particularly the following advantageous properties:

(a) foldability in the cold (according to the method described hereinafter): no cracks at temperatures as low as $-40°$ C.;

(b) TBA softening point $\geq 140°$ C.;

(c) elongation at break (according to NFG 07 001): 800% to 2000%;

(d) thermal behavior: after several hours at 250° C. and ½ hour at 300° C., the softening point and the foldability in the cold are unchanged.

The composition of this invention is particularly useful for sealing purposes and, thus, this invention relates also to a composite sealing sheet comprising at least a reinforcing support carrying a bitumen-based composition as defined above.

Other features and advantages of this invention will become apparent to those skilled in the art from the following disclosure.

The composition of this invention consists of a ternary bitumen, polyolefin, and butadiene-styrene mixture.

The bitumen is present in an amount of 52–78 wt% by weight of the mixture and may be a straight-run or an oxidized bitumen. The preferred bitumen grades have penetrations from 40 to 220. For a given composition of the ternary mixture, the influence of the grade of the bitumen is predominantly reflected by differences of thermal susceptibility, while the other properties are not basically affected.

The composition comprises additionally 20-40 wt% of a polyolefin, and preferably 22-30 wt%.

The term "polyolefin" is meant here to include the products resulting from the polymerization or copolymerization of one or more monoethylenic hydrocarbons (the macromolecular chains may have any configuration).

Typically homopolymers such as polypropylene or polybutylene, and copolymers such as ethylene-propylene copolymers and propylene-ethylene-butylene copolymers are used as polyolefins.

Generally speaking, the compatibility of amorphous polyolefins, i.e., of random structure, with bitumen is good.

On the other hand, the polyolefins in which the straight chains contain more or less long "pendant" groups, provide better compatibility with bitumens. Similarly, the length of the macromolecular chains has a highly marked influence on the compatibility of such a system; therefore, it should be sufficiently long to provide a sufficient viscosity. Thus, such polyolefins will have a viscosity of the order of 10,000 to 30,000 centipoises (at 190° C., and under a low shearing rate) and a softening point (TBA) between about 100° C. and about 180° C.

Finally, the composition includes 2-8 wt% of a butadiene-styrene elastomer, and preferably 3-8 wt%.

When combined with bitumen, the random or block butadiene-styrene copolymers provide varying degrees of increase of the elastic behavior of the mixture, which is predominantly reflected by a high elongation at break.

Whatever the structure of said elastomers, their molecular weight should not be too high, to be compatible with the two other components, the bitumen and the polyolefin.

A particularly suitable elastomer is a tri-block styrene-butadiene-styrene copolymer having a molecular weight from about 100,000 to about 300,000.

The above percentage ranges are important: indeed, when the percent polyolefin exceeds the upper limit of the range, the viscosity of the composition is notably high, the flexibility in the cold is only very little improved and the ultimate tensile strength increases very rapidly.

In contrast, when the amount of polyolefin is too low, the thermal behavior is very poor (TBA < 100° C.), flow resistance is nil, and thermal susceptibility is verh high.

Finally, with too high an amount of styrene-butadiene elastomer, viscosity increases excessively rapidly and ultimate tensile strength becomes inordinately high; in addition, resistance to thermal degradation decreases. When the amount of elastomer is too low, the mixture has no elasticity and exhibits poor flexibility in the cold.

Depending on the uses contemplated, the composition may also contain an inorganic filler, in high amounts of up to about 60 wt% with respect to the weight of the ternary mixture; slate powder, silica, limestone, are examples of such fillers.

Pigments (such as iron, chromium, titanium oxides, etc.), fireproofing materials (such as antimony oxide) and other suitable additives may also be introduced into the composition.

To prepare the composition, the components are mixed together at a temperature of at least 170° C., until a homogeneous mass is obtained.

To demonstrate the superiority of the composition of this invention over the aforementioned bituminous compositions of the prior art, the properties of compositions used for sealing purposes for roofs and terraces were compared. The composition of this invention is referred to as BPS and is referred to as such as the disclosure proceeds.

The preferred values for the different properties are: a high TBA, a tensile elongation at break $\geq 1000\%$, a foldability temperature in the cold as low as possible, a high flow resistance and a good thermal stability.

The results obtained are set forth in following Table I.

In the BPS composition of this invention, the polyolefin is a propylene-ethylene-butylene copolymer and the elastomer is a tri-block styrene-butadiene-styrene copolymer having a molecular weight of about 200,000.

It is apparent from the results set forth in Table I that the composition of this invention exhibits a favourable combination of properties not exhibited by the other compositions according to the prior art.

The bituminous composition of this invention may be used alone with, if desired, a filler and/or a pigment and/or other aforementioned additives. It may be applied as a melt, at a temperature of about 250° C., to fill in sealing joints, as coating to be applied in the hot, as road binder, and the like. It may be applied as a solution in aliphatic or aromatic hydrocarbons, of naphtha type for example, in the form of a mastic.

For such applications, the elastomer is advantageously present in an amount within the median area of the aforementioned range.

The composition of this invention is also useful for the production of composite sealing sheets also included within the scope of the present invention.

Said sealing sheets comprise a reinforcing support over which the aforementioned composition is applied.

Useful reinforcing materials include conventional substrates such as felt board, glass or jute cloth, glass

TABLE I

| Binders Properties | Oxidized bitumens "Blown" bitumens | SBS bitumens | PPA bitumens | B.P.S. |
|---|---|---|---|---|
| Composition | | | | |
| | | Straight-run bitumen 80/100 + 10-15% SBS (total 100%) | Straight-run bitumen 80/100 + ~30% PPA (total 100%) | Straight-run bitumen 80/100 + 25% polyolefin + 5% elastomer (total 100%) |
| TBA, °C. | 90-125 | -130 | ~145 | 145 |
| Penetration 25° C.-1/10 mm | 40-25 estimated | 40-60 | ~30 | 30-35 |
| Tensile | | | | |

TABLE I-continued

| Binders Properties | Oxidized bitumens "Blown" bitumens | SBS bitumens Straight-run bitumen 80/100 + 10-15% SBS (total 100%) | PPA bitumens Straight-run bitumen 80/100 + ~30% PPA (total 100%) | B.P.S. Straight-run bitumen 80/100 + 25% polyolefin + 5% elastomer (total 100%) |
|---|---|---|---|---|
| | | Composition | | |
| elongation at break-% | between 50 and 100% | 1500-2000 | 100-400 | 1500 |
| Foldability in the cold: resists at (°C.) | >0 | -10 to -30 | 0 to -10 | -30, -40 |
| Flow resistance reinforced binder, resists at (°C.) | >90 | >90 | >110 | >110 |
| Thermal stability, ½ hr at 300° C., TBA drop (°C.) | <10 | >40 | <10 | <10 |
| Weldability | fair | poor | very good | very good | voile, metal sheets, and the like. Also useful are unwoven synthetic materials (particularly polyester) with a weight of about 50-500 g/m², and a tensile elongation at break in excess of 10%.

Synthetic fibre cloths (polyester, polyamide, and the like) with a weight of about 50-500 g/m² and a high elongation at break of 10-40% may also be used.

To insure the best homogeneity between the properties of the BPS and of the reinforcing material, it is preferred to use a reinforcing material that combines a mechanical strength ≧3 da N/cm with a high elongation at break ≧10%.

Thus, the sealing sheet may be available as a flat expansion seal. It may be prepared as follows:

The reinforcing material, having the desired width (1 m, for example) and of infinite length, is immersed in a tank containing the molten BPS at about 180° C., so that its constituent material may be perfectly impregnated or coated.

The reinforcing material is then passed between two heated horizontal rolls, so that the BPS may be deposited on both its upper and lower surfaces.

The BPS-coated sheet may then be submitted to a surface sand-blasting on both sides, to prevent the adhesion of the bituminous mass on the downstream production equipment leading to the cutting-up of the product to give rolls having generally a size of 10 or 20 m².

Instead of being subjected to a sand-blasting treatment, the sheet may be provided on one of its surfaces either with a self-protection with inorganic granules or slate flakes adhered to the re-heated BPS, or a metal sheet initially provided with a particular pattern imparting heat-stable properties to the sealing sheet, or a sheet of Kraft paper, and the like.

A sheet (such as a sheet of Kraft paper) may also be coated on one side only with BPS, which sheet may, if desired, be removed at the time of the application of the product.

It is thus possible to obtain sealing sheets:

(a) with a glass cloth basis, in the form of a sheet sand-blasted on both sides (3-6 mm thickness) or coated over one surface with a metal foil or inorganic granules. Such a sheet is very readily welded by means of a blow-torch. It may be used to provide sealing elements or as a component member of a sealing complex.

(b) with a glass voile basis, similar to those described above, applicable to bridges, tunnels and like structures and also useful as a component member of a sealing complex.

(c) with an unwoven synthetic material basis, similar to those described above, applicable to bridges, tunnels and like structures, and also to garden terraces, parking lots and roofs.

(d) with a synthetic fibre cloth basis, similar to those described above, applicable as flat expansion joint and as a component member of a sealing complex.

For such applications, the elastomer content of BPS will advantageously be within the higher values of the range.

The sealing sheet may also be a BPS sheet protected as previously described, having a thickness of about 2 mm to about 4 mm and useful for the bridging of joints.

The composite sealing sheet may also be in the form of an assembly of a plurality of sealing sheets, such as a layer formed on a BPS-coated glass cloth reinforcement and a layer of BPS-coated polyester reinforcement, both layers being adhesively secured together by heating, by means of a blow-torch, for example.

Such composite members are typically useful to effect seal coats for garden terraces, parking lots, roofs, tanks, and the like.

For such applications, the elastomer content of the BPS will advantageously be within the lower values of the range.

The following non-limiting Examples are given to illustrate the present invention.

EXAMPLE 1

A composition useful as coating mastic applicable in the hot is prepared from the following ingredients:

| Straight-run bitumen 80/100 | 70 wt% |
|---|---|
| Ethylene-propylene copolymer | 25 wt% |
| Styrene-butadiene-styrene block copolymer | 5 wt% |

The properties of this BPS are given in following Table II.

EXAMPLE 2

A sealing sheet useful as flat expansion seal is prepared in the form of a roll 15 m long and 50 cm wide, having a thickness of 3–4 mm and weighing about 4 kg/m2.

The composition, per m2, is as follows:

| | |
|---|---|
| Reinforcement (polyamide cloth) | 160 g/m2 |
| BPS | 3.200 g/m2 |
| White silica | 610 g/m2 |

The BPS has the following composition:

| | |
|---|---|
| Straight-run bitumen 80/100 | 71 wt% |
| Propylene-ethylene-butylene copolymer | 23 wt% |
| Butadiene-styrene elastomer | 6 wt% |

The sheet has the following properties:
Ultimate tensile strength and tensile elongation at break (determined according to NFG 07 001):
Lengthwise: 40 daN/cm and 20%
Breadthwise: 30 daN/cm and 20%
Foldability in the cold:
5 second rolling up time over a mandrel having a diameter of 20 mm.
No cracks to a temperature of −30° C.
Flow in an oven, in a vertical position
No flow up to 110° C.

Static punching (according to NFP 84 352)
In excess of 22 kg on the perlite-based insulating panel In excess of 15 kg on the polystyrene panel.

This sealing sheet has a very high flexibility in the cold and withstands severe tensile, compressive and shearing stresses, particularly where joints cross.

Also, it adapts itself perfectly to the irregular shapes of the support.

In addition to its high characteristics at the level of mechanical strength and of tensile elongation at break, it possesses an excellent reaction toward static punching.

EXAMPLE 3

A two-layer composite sealing sheet is produced in the following manner:

The lower layer or sheet consists of a 10 m2 roll (1 m × 10 m) weighing 4 kg/m2 and which has a minimum thickness of 4 mm.

The composition, per m2, is as follows:

| | |
|---|---|
| Reinforcement (glass voile) | 50 g/m2 |
| BPS | 3,300 g/m2 |
| White silica | 650 g/m2 |

The BPS has the following composition:

| | |
|---|---|
| Bitumen, 80/100 | 67 wt% |
| Polypropylene | 30 wt% |
| Styrene-butadiene-styrene block copolymer | 3 wt% |

This layer has the following properties:
Flexibility in the cold: no cracks over a mandrel ($\phi$20 mm, 5 seconds roll-up time) to a temperature of −10° C.
Flow resistance: above 100° C.
Elongation at break of the binder: in excess of 20%

The upper layer or sheet has the same composition as the lower layer, except that the reinforcement consists of an unwoven polyester material weighing 250 g/m2 having an elongation at break in excess of 20% (instead of the glass voile).

The sealing composite obtained by torch-welding of both layers has the following properties:
Static punching: above 20 kg
Crack resistance at 0° C.: with respect to a conventional complex, it withstands an opening and closing motion of a 2 mm joint for a period of time multiplied by a factor of at least 5.

Following Table II sets forth the test results obtained with different BPS compositions, columns 1 to 7 giving comparative results obtained with compositions of the prior art.

The bitumen used is a straight-run bitumen having a penetration of 80/100, the polyolefin is a propylene-ethylene-butylene copolymer, and the elastomer is a styrene-butadiene-styrene block copolymer.

Foldability in the cold was determined as follows:
A regular roll-up test over a cylindrical mandrel having a diameter of 20 mm is effected with conditioned samples according to NF G 07 001, having a length of 250 mm. Roll-up time is 5 seconds.

The samples and the mandrel are conditioned for a period of time of at least two hours in an enclosure conditioned at the test temperature.

The lowest temperature which the sample is capable of withstanding without exhibiting any cracks is determined, said temperature being determined by successive increments of 5° C. each.

The flow resistance was determined as follows:
Samples according to NFG 07 001 and 250 mm long are suspended vertically in a forced air oven.

Initial temperature is 70° C. After conditioning for several hours, the temperature is increased stepwise by

TABLE II

| Composition Properties | | | | | | | | | | | | | | | |
|---|---|---|---|---|---|---|---|---|---|---|---|---|---|---|---|
| % bitumen | 100 | 90 | 80 | 75 | 70 | 60 | 50 | 73 | 72 | 71 | 70 | 67 | 57 | 52 |
| % polyolefin | 000 | 10 | 20 | 25 | 30 | 40 | 50 | 25 | 25 | 25 | 25 | 25 | 40 | 40 |
| % elastomer | 000 | 00 | 00 | 00 | 00 | 00 | 00 | 02 | 03 | 04 | 05 | 08 | 03 | 08 |
| TBA, °C. | 42 | 51 | 63 | 142 | 140 | 145 | 150 | 130 | 135 | 140 | 143 | 143 | 145 | 148 |
| Penetration at 25° C. (1/10 mm) | 100 | 54 | 37 | 35 | 34 | 31 | 27 | 35 | 35 | 33 | 33 | 32 | 28 | 27 |
| Maximum tensile stress (daN/cm$^2$) | <0.2 | ≅0.2 | 1.3 | 2.5 | 2.7 | 5.2 | 8 | 3.5 | 4 | 3 | 3.6 | 3 | 4.5 | 5 |
| Tensile elongation at break | Not measurable | 200 | 300 500 | 500 | 400 | 350 | 800 | 700 | 1350 | 1400 | 1500 | 1400 | 500 | 500 |
| Foldability in the cold resists at (°C.) | >0 | >0 | >0 | >0 | −5 | −5 | −10 | >0 | −5 | −15 | −30 | −30 | −10 | −25 |

5° C. increments at 60 minute intervals, the limiting temperature being that which induces neither creeping nor flow.

Having now described my invention what I claim as new and desire to secure by Letters Patent is:

1. Bitumen-, polyolefin- and elastomer-based sealant composition consisting essentially of a mixture of (a) 52-78 wt. % of bitumen, (b) 20-40 wt. % of a polyolefin selected from a polypropylene, a polybutylene, an ethylene-propylene copolymer and a propylene-ethylene-butylene copolymer and having a viscosity in the order of 10,000 to 30,000 centipoises at 190° C. and a TBA softening point between about 100° C. and about 180° C., and (c) 2-8 wt. % of a styrene-butadiene copolymer elastomer having a molecular weight of about 100,000 to about 300,000, said composition having a TBA softening point of at least 140° C., a tensile elongation at break of about 800% to about 2000%, and a flexibility in the cold such that cracks do not form at temperatures as low as −40° C.

2. Composition as claimed in claim 1, wherein said mixture contains 22-30 wt% polyolefin.

3. Composition as claimed in claim 1, wherein said mixture contains 3-6 wt% elastomer.

4. Composition as claimed in claim 1, wherein the bitumen is a straight-run bitumen having a penetration of 40-220.

5. Composition as claimed in claim 1, wherein the bitumen is an oxidized bitumen having a penetration of 40-220.

6. Composition as claimed in claim 1, containing an additional component selected from a filler, a pigment, a fireproofing agent and mixtures thereof.

7. Composite sealing sheet, consisting essentially of at least a reinforcing support carrying a composition comprising a mixture of (a) 52-78 wt. % bitumen, (b) 20-40 wt. % of polyolefin selected from a polypropylene, a polybutylene, an ethylene-propylene copolymer and a propylene-ethylene-butylene copolymer and having a viscosity in the order of 10,000 to 30,000 centipoises at 190° C. and a TBA softening point between about 100° C. and about 180° C., and (c) 2-8 wt. % of a styrene-butadiene copolymer elastomer having a molecular weight of about 100,000 to about 300,000, said composition having a TBA softening point of at least 140° C., a tensile elongation at break of about 800% to about 2000%, and a flexibility in the cold such that cracks do not form at temperatures as low as −40° C.

8. Sealing sheet as claimed in claim 7, in the form of a sheet consisting of a reinforcing material coated with said composition.

9. Sealing sheet as claimed in claim 7, in the form of at least two sheets as defined in claim 10 adhesively secured together.

10. Sealing sheet as claimed in claim 7, wherein said mixture contains 22-30 wt% polyolefin.

11. Sealing sheet as claimed in claim 7, wherein said mixture contains 3-6 wt% elastomer.

12. Sealing sheet as claimed in claim 7, wherein the bitumen is a straight-run bitumen having a penetration of 40-220.

13. Sealing sheet as claimed in claim 7, wherein the bitumen is an oxidized bitumen having a penetration of 40-220.

14. Sealing sheet as claimed in claim 7, containing an additional component selected from a filler, a pigment, a fireproofing agent and mixtures thereof.

* * * * *

UNITED STATES PATENT AND TRADEMARK OFFICE
CERTIFICATE OF CORRECTION

PATENT NO. : 4,282,127
DATED : August 4, 1981
INVENTOR(S) : Henri Francis Maurice DESGOUILLES It is certified that error appears in the above-identified patent and that said Letters Patent are hereby corrected as shown below:

Amend the heading of the patent as follows:

--[73] Assignee: Composants Industrialises Du Batiment par abreviation C.I.B.,

Lieudit Le Pont Hurey, France --.

Signed and Sealed this

Sixteenth Day of March 1982

[SEAL]

*Attest:*

GERALD J. MOSSINGHOFF

*Attesting Officer*  *Commissioner of Patents and Trademarks*